United States Patent [19]

Ito

[11] Patent Number: 4,948,773

[45] Date of Patent: Aug. 14, 1990

[54] AMPHORA PARTICULATE CATALYST-SUPPORT AND A METHOD FOR THE PREPARATION OF AN AMPHORA-TYPE PARTICULATE CATALYST-SUPPORT

[75] Inventor: Toshio Ito, Sodegaura, Japan

[73] Assignee: Research Association for Petroleum Alternatives Development, Tokyo, Japan

[21] Appl. No.: 310,232

[22] Filed: Feb. 13, 1989

[51] Int. Cl.$^5$ .................... B01J 35/08; B01J 37/10
[52] U.S. Cl. .................................. 502/247; 502/9; 502/242; 502/439; 502/527
[58] Field of Search .................................. 502/8–10, 502/247, 250, 527, 439, 242

[56] References Cited

U.S. PATENT DOCUMENTS

| | | | |
|---|---|---|---|
| 3,848,033 | 11/1974 | Callahan et al. | 502/9 |
| 4,094,922 | 6/1978 | Bartek et al. | 502/527 |
| 4,124,535 | 11/1978 | Farrington et al. | 502/8 |
| 4,170,569 | 10/1979 | Herrington et al. | 502/9 |

FOREIGN PATENT DOCUMENTS

| | | | |
|---|---|---|---|
| 1065270 | 10/1979 | Canada . | |
| 90188 | 8/1978 | Japan | 502/250 |
| 3044943 | 2/1988 | Japan | 502/527 |
| 152653 | 12/1979 | U.S.S.R. | 502/527 |

*Primary Examiner*—Carl F. Dees
*Attorney, Agent, or Firm*—Frishauf, Holtz, Goodman & Woodward

[57] ABSTRACT

An amphora-type particulate catalyst-support having an adequately small average particle size and a low attrition index and a method for preparing an amphora-type particulate catalyst-support are disclosed, wherein the method comprises the steps of: (a) forming a mixed slurry having a solid content of 10 to 30 wt % by adding water to a mixture of 60 to 80 parts by weight of a component (A) comprising at least one component selected from the group consisting of allophane, red mud, bauxite, and laterite with 20 to 40 parts by weight of a binder (B), such as silica sol, alumina-titania, etc.,; (b) wet grinding the solid in the mixed slurry to form a slurry of finely divided solid having an average particle size of 0.6 to 2.0 μm; (c) spray-drying the slurry of the finely divided solid to form spray-dried particles; and (d) calcining the spray-dried particles.

The catalyst-supports can be advantageously used as a support for preparing particulated catalysts having improved properties; i.g., high catalytic activities and selectivities, a high anti-attrition property, etc., especially those which are very effective for the hydrotreating of a heavy oil, such as a vacuum reside, etc., giving a high yield of a kerosine-light oil fraction with a low hydrogen consumption and low yields of byproducts, such as cokes, asphaltenes, and the like.

12 Claims, No Drawings

AMPHORA PARTICULATE CATALYST-SUPPORT AND A METHOD FOR THE PREPARATION OF AN AMPHORA-TYPE PARTICULATE CATALYST-SUPPORT

BACKGROUND OF THE INVENTION (a) Field of the Invention

The present invention relates to an amphora-type particulate catalyst-support and to a method for the preparation of an amphora-type particulate catalyst-support.

More particularly the present invention relates to an amphora-type particulate catalyst-support which can be suitably used as a support for a variety of catalysts, including those to be used in the field of petroleum refining processes, especially in hydrotreatings, including hydrocracking, hydrogenolysis, hydrogenation, hydrofining, and the like of heavy oils such as atmospheric residuum, tar sands bitumens, shale oils, etc., and to a method for the preparation of the above-described amphora-type particulate catalyst-support.

(b) Related Art

Amphora-type particulate catalyst-support is a catalyst support comprising particles whose particle structure is characterized by near spherical or spheroidal form with a cavity (a space inside a particle) wherein the space inside the particle is opened to the space outside the particle through a single aperture (opening pore) at the outer surface of the particle. Because the structure of the particle resembles that of a roundish container having a cavity with a single opening such as an amphora, a bottle, an urceolate or the like, catalyst supports comprising particles of such a particular form have been represented by a term, "an amphora-type particulate catalyst-support".

Some known amphora-type particulate catalyst-supports have been preferably used as supports for certain catalysts because they are advantageous in respect of their large external surface area.

One of the known methods for preparing amphora-type particulate catalyst-supports have been disclosed in Japanese Patent Application Publication No. 58-10140. In this conventional method, amphora-type particles having an average particle size of 44 to 155 μm are prepared by dropping small drops of a slurry comprising a component of a catalyst into a particle-bed.

Another known method for preparing an amphora-type particulate catalyst-support described in Japanese Patent Application Publication No. 58-31974 is a method which comprises the steps of (i) forming small drops of a slurry whose viscosity is in the range of about 400 to 8,000 centipoise, (ii) dropping the slurry drops to a stationary powder-bed under such conditions that a whole drop does not completely submerge in the powder, and (iii) drying the drops without stirring to obtain amphora-type particles having an average particle size of about 2 to 3 mm.

However, the amphora-type particles prepared by the above-described methods have disadvantages or problems especially in the aspects that: their particle sizes are too large: the improvement in catalytic activity is not enough; and the mechanical strength of the particles is low in practical use.

SUMMARY OF THE INVENTION

An object of the present invention is to provide an amphora-type particulate catalyst-support having improved properties, i.e., an adequately small average particle size and a low attrition index, which can be suitably used as a support for preparing catalysts, especially those which are superior in catalytic activity in the hydrotreating of a heavy oil and can give a high yield of kerosine-light oil fraction with a small consumption of hydrogen, and moreover have a long catalyst-life without attrition or breakdown of the catalyst particles used even in a slurry-type process in which the catalyst particles and other contents such as a heavy oil, hydrogen, etc. are mixed with vigorous stirring.

Another object of the present invention is to provide a method for the preparation of an amphora-type particulate catalyst-support having the above-described, improved properties without the disadvantages and problems in the conventional methods.

Thus, the present invention provides an amphora-type particulate catalyst-support having an average particle size of 30 to 200 μm and an attrition index of not larger than 10 and also provides a method for the preparation of an amphora-type particulate catalyst-support which comprises the steps of:

(a) forming a mixed slurry having a solid content of 10 to 30% by weight by adding water to a mixture of 60 to 80 parts by weight of a component (A) comprising at least one component selected from the group consisting of allophane, red mud, bauxite, and laterite with 20 to 40 parts by weight of a binder (B);

(b) grinding the solid in the mixed slurry by using a wet grinding technique to form a slurry of finely divided solid having an average particle size of 0.6 to 2.0 μm;

(c) spray-drying the slurry of the finely divided solid to form spray-dried particles; and (d) calcining the spray-dried particles to obtain an amphora-type particulate catalyst-support.

PREFERRED EMBODIMENTS OF THE INVENTION

The average particle size of the amphora-type particulate catalyst-supports of the present invention is in the range of 30 to 200 μm. If the average particle size is less than 30 μm, the solid-liquid separation of the used catalyst particles and the produced oil is difficult when such small support particles were used as a catalyst or a support of a catalyst. On the other hand, if it is in excess of 200 μm, the suspension or diffusion of the catalyst particles in a slurry bed is insufficiently established, resulting in a low reaction efficiency.

The attrition index of the amphora-type particulate catalyst-supports of the present invention is not larger than 10. When it is not in excess of 10, the destruction; i.e., the attrition, breakdown, or the like, of the used catalyst particles hardly occurs in a slurry bed reactor as well as in a catalyst-regeneration tower and the solid-liquid separation of the used catalyst particles and the produced oil can easily be performed because only a very small amount of broken pieces of the catalyst particles is formed in the slurry-type process.

Furthermore, it is important that the catalyst-support of the present invention comprises particles of an amphora-type or having a cavity or a dent. A variety of amphora-type particulate catalysts including supported metal catalysts, supported metal oxide catalysts, and the like, can easily be prepared by using the amphora-type particulate catalyst-supports of the present invention as a support by applying known techniques, such as an impregnation method, etc. If a conventional particulate catalyst comprising support particles which are not of an amphora-type or do not have a dent or a cavity is used as a catalyst for the hydrotreating of a heavy oil under a slurry condition, too much hydrogen is consumed while undesired by-products; i.e., cokes, deposited asphaltenes, and the like being produced in high yields. Further, support particles of a too porous type also have a defect that such particles usually have a low anti-attrition property.

In the present invention, the values of average particle size are represented by those obtained by a conventional light scattering method by using a microtrac particle-size analyzer of LEEDS & NORTHRUP COMPANY.

In the present invention, the values of attrition index are represented by weight % of the weight loss of a particulate catalyst-support that occurred in the period of from 12 to 48 hr in an attrition test of the particulate catalyst-support wherein 45 g of the produced particulate catalyst-support was made to run in an attrition testing apparatus by flowing air at room temperature and at a linear flow rate of 267 m/sec, the attrition testing apparatus being usually used for measuring an attrition index of a catalyst for fluidized catalytic cracking (FCC) catalyst. It is to be understood that the smaller the value of the attrition index, the higher the anti-attrition property of the particles of the particulate catalyst-support.

The amphora-type particulate catalyst-supports of the present invention can be prepared by various methods, preferably by the method which comprises the steps of:

(a) forming a mixed slurry having a solid content of 10 to 30% by weight by adding water to a mixture of 60 to 80 parts by weight of a component (A) comprising at least one component selected from the group consisting of allophane, red mud, bauxite, and laterite with 20 to 40 parts by weight of a binder (B);

(b) grinding the solid in the mixed slurry by using a wet grinding technique to form a slurry of finely divided solid having an average particle size of 0.6 to 2.0 μm;

(c) spray-drying the slurry of the finely divided solid to form spray-dried particles; and (d) calcining the spray-dried particles to obtain an amphora-type particulate catalyst-support.

By using the above-described method, amphora-type particulate catalyst-supports having an average particle size of 30 to 200 μm and improved properties; i.e., a high catalytic activity and a high anti-attrition property, can be easily prepared.

The binders (B) that can be used in the method of the present invention include a gel or sol of hydrated oxides, such as silica, alumina, alumina-titania, etc., and adhesives, such as rosin, pitch, polyvinyl acetate, phenolformaldehyde resin, etc., and the like. Among them, silica and alumina-titania can be preferably used in the respect of the anti-attrition property. It is preferred that the ratio of alumina to titania ($Al_2O_3/TiO_2$) in the alumina-titania be in the range of 19/1 to 3/7 by weight ratio.

It is preferable to remove undesirable impurities from component (A) by a water-sieving technique before the step (a) as occasion demands.

In the step (a), a uniformly mixed slurry having a predetermined solid content is prepared by mixing the component (A) and binder (B) with a predetermined amount of water.

Ion exchanged water can be preferably used for preparing the mixed slurry in the step (a).

If the amount of the binder (B) used in the step (a) is less than 20 parts by weight per 100 parts by weight of the total amount of component (A) and the binder (B), the mechanical strength and especially the anti-attrition property of the obtained catalyst-support obtained may not be adequately high and it may be difficult to apply the thus prepared catalyst-supports to a slurry-type process. While, if it is in excess of 40 parts by weight per 100 parts by weight of the total amount of component (A) and the binder (B), there may be some problems such that the yield of a coke as well as that of an asphaltene during hydrogenation reaction is increased and that a sufficient catalytic performance is hardly obtained.

Moreover, if the solid content of the mixed slurry is less than 10% by weight, a catalyst-support containing a large amount of undesirable fine particles having particle sizes of 30 μm or less in diameter is produced and, therefore, an additional separation step, such as a sieving step, etc., for removing undesirable fine particles is needed for obtaining the intended catalyst-support, and consequently the loss of the raw materials becomes large. On the other hand, if it is in excess of 30% by weight, the nozzle of a spray-drier tends to be plugged with the solid and, as the result, the preparation of a catalyst-support may become difficult or impossible.

The wet grinding of the solid in the thus prepared, mixed slurry in the step (b) is performed by using a wet-grinding machine until the average particle size of the solid in the slurry be in the range of 0.6 to 2.0 μm. Known techniques can be applied to the wet grinding. It is preferred that a viscosity of the slurry of finely divided solid obtained in the step (b) be in the range of 10 to 17,000 centipoise.

The catalyst-supports of the present invention; i.e., the amphora-type particulate catalyst-supports having an average particle size of 30 to 200 μm, can be obtained by spray-drying the above prepared slurry of the finely divided solid by using a spray drier at a nozzle pressure of 3 to 200 kg/$cm^2$ and at a drying temperature of 80° to 300° C., and with a residence time of 1 to 10 sec to obtain spray-dried particles in the step (c), followed by calcining the spray-dried particles at a temperature of 450° to 750° C. in the step (d).

If the average particle size of the finely divided solid in the slurry used in the step (c) is less than 0.6 μm, the particles of the obtained catalyst-support tend to be only spherical in shape without a cavity. While, if it is in excess of 2.0 μm, they tend to be too porous (multi-porous).

A variety of hydrogenation catalyst can be prepared by supporting metals common in the field of hydrogenation on the amphora-type particulate catalyst-supports of the present invention. Some examples of the metals to be supported on the catalyst-supports of the present invention include banadium, nickel, iron, molybdenum, tungsten, cobalt, and the like.

Typical catalysts for the hydrotreating of a heavy oil can be prepared by supporting vanadium and nickel components on the thus prepared catalyst-support of the present invention by using a conventional method, such as a vacuum impregnation method, a wet impregnation method, etc. In the case of using the vacuum impregnation method, the loading of vanadium and nickel as well as a ratio of vanadium to nickel can be easily adjusted by changing the amount of ammonium vanadate and that of nickel nitrate dissolved in ion exchanged water used in the impregnation, for example. Suitable loadings of vanadium and nickel in those catalysts can be from 1 part to 20 parts by weight and 0.5 part to 10 part by weight, preferably 2 to 10 parts by weight and 1 part to 5 parts by weight, respectively, per 100 parts by weight of the catalyst-support wherein suitable ratios of vanadium to nickel can be in the range of 0.5 to 3.0, preferably 1 to 2, by weight ratio. The catalysts can be obtained by drying the thus impregnated particles, followed by calcination.

The hydrotreating of a heavy oil can be preferably performed by using the particulate catalyst prepared by the method as described above under the conditions as follows. Suitable reaction temperatures can be in the range of 400° to 600° C. and LHSV in the reaction can be selected from those in the range of 0.2 to 10 hr$^{-1}$. Suitable reaction pressures can usually be from atmospheric pressure to 200 kg/cm$^2$. Suitable particle sizes of the catalyst are in the range of 10 to 300 μm, preferably 37 to 150 μm. A suitable concentration of the catalyst in the mixture of the catalyst and the heavy oil in a slurry state can be from 1 to 30% by weight, preferably from 2 to 10% by weight.

The catalysts obtained can be used in different reaction manners, including those of a fixed bed, a fluidized bed, a moving bed or transporting bed, etc., beside a slurry bed such as the case described above.

The present invention is described in further detail by way of the following examples: However, it is not necessarily limited to the examples.

EXAMPLES 1 TO 6 AND COMPARATIVE EXAMPLES 1 AND 2

EXAMPLE 1

An allophane which was previously prepared from a raw allophane from Mouka city in Tochigi Prefecture in Japan by removing undesirable impurities by means of a water sieving technique was used as a starting material of a catalyst-support. A uniformly mixed slurry having a solid content of 20% by weight was prepared by adding ion exchanged water to a mixture of 70% by weight (dry base after calcination) of silica sol and 30% by weight (dry base after calcination) of the allophane prepared above. The solid in the resulting slurry was then ground by using a wet grinding machine to obtain a mixed slurry of finely divided solid having an average particle size of 1.38 μm.

The resulting mixed slurry was spray-dried under the conditions that nozzle pressure was 30 kg/cm$^2$, drying temperature 200° C., and residence time 1 sec, to obtain spray-dried particles. A particulate catalyst-support having an average particle size of 37 to 115 μm was prepared by calcining the spray-dried particles at 500° C.

A supported vanadium-nickel catalyst was prepared from the above prepared catalyst-support by applying a conventional vacuum impregnation method, followed by calcining at 600° C. The loadings of vanadium and nickel in the catalyst were 2 parts by weight and 1 part by weight, respectively, per 100 parts by weight of the catalyst-support. Therefore, the ratio of the loading of vanadium to that of nickel was 2.

Properties of the catalyst-supports prepared

Anti-attrition properties of the catalyst-supports were measured by using the following method.

Method for testing the anti-attrition property of the support

In an apparatus which is usually used for measuring anti-attrition property of catalyst for fluidized catalytic cracking (FCC) catalyst, 45 g of the prepared catalyst was placed and fluidized at room temperature by passing air at a linear flow rate of 267 m/sec for 42 hr. The rates of the weight losses of the support particles after 12 hr and 42 hr were measured, respectively. The initial attrition rate of the support was represented by the rate of the weight loss by wt % in the period of from 0 hr to 12 hr, while the attrition index by that in the period of from 12 hr to 42 hr. The smaller the value of the attrition index, the higher the anti-attrition property of the catalyst-support.

Some other properties, including specific surface area, pore size distribution and specific pore volume, were also measured by using conventional methods.

Procedure of the catalytic hydrocracking of a vacuum residuum

A vacuum residuum of Arabian Heavy of which properties listed in Table 2 was used as a reactant oil.

Into an autoclave were introduced 80 g of the vacuum residuum and 10 g of a particulate supported vanadium-nickel catalyst comprising 2 parts by weight of vanadium and 1 part by weight of nickel per 100 parts by weight of the support, and the hydrocracking of the vacuum residuum was performed for 1 hr with good stirring at a reaction temperature of 450° C. and at a reaction pressure of 85 kg/cm$^2$G. The stirring rate was 700 rpm.

EXAMPLE 2

The same procedure of Example 1 was repeated, except that an alumina-titania sol comprising 90 wt % of alumina and 10 wt % of titania was used in place of the silica sol.

EXAMPLE 3 AND COMPARATIVE EXAMPLES 1 AND 2

The procedure of Example 1 was similarly repeated wherein catalyst-supports comprising particles having different average sizes and shapes were prepared by spray-drying slurries comprising finely divided particles of different average particle sizes which had been controlled by changing the degree of wet grinding of the solid in the mixed slurry.

The results of Examples 1–3 and Comparative examples 1 and 2 are summarized in Tables 1 and 3.

EXAMPLE 4

The same procedure of Example 1 was repeated, except that red mud exhausted from an alumina production process was used in place of the allophane. The result is shown in Table 4.

EXAMPLE 5

The same procedure of Example 1 was repeated, except that a bauxite from Sumatra was used in place of the allophane.

The result is shown in Table 4.

EXAMPLE 6

The same procedure of Example 1 was repeated, except that a laterite (produced in Japan) was used in place of the allophane.

TABLE 1

| Effect of binder on the properties of the support | | |
|---|---|---|
| | Example 1 | Example 2 |
| Binder used[*1] | silica | alumina-titania |
| Average particle size after wet grinding (μm) | 1.38 | 1.29 |
| Apparent bulk density (g/ml) | 0.69 | 0.69 |
| Shape of the support prepared | amphora-type | amora-type |
| Anti-attrition property of the support | | |
| Initial attrition rate (wt. %/12 hr) | 3.9 | 4.8 |
| Attrition Index (wt. %/30 hr) | 6.3 | 2.4 |
| Specific surface area (m$^2$/g) | 276 | 247 |
| Specific pore volume (ml/g)[*2] | 0.37 | 0.28 |

[*1]Amount of the used binder is 30 wt. % on the dry base after calcination.
[*2]Nitrogen method

TABLE 2

| Properties of feed oil | | Vacuum residuum of Arabian Heavy (VR-AH) |
|---|---|---|
| Specific gravity | (15/4° C.) | 1.0216 |
| Kinematic viscosity | (100° C.) | 1400 |
| (CST) | (120° C.) | 400 |
| | 150° C.) | 100 |
| Pour point | (°C.) | +45.0 |
| Sulfur content | (wt %) | 4.85 |
| Nitrogen content | (wt %) | 0.324 |
| Metal contents | vanadium | 110 |
| (PPM) | nickel | 34 |
| | iron | 15 |
| Conradson carbon residue | (wt %) | 20.5 |
| Total carbon content | (wt %) | 84.6 |
| Total hydrogen content | (wt %) | 9.9 |
| Composition analysis | Asphaltenes (wt %) | 7.5 |
| | Resins (wt %) | 20.9 |
| | Aromatics (wt %) | 52.9 |
| | Saturated hydrocarbons (wt %) | 18.7 |

TABLE 3

| Effect of the average particle size of the slurried solid particles (binder:silica) | | | | |
|---|---|---|---|---|
| | Example 1 | Example 3 | Comparative example 1 | Comparative example 2 |
| Average particle size of slurried solid particles (μm)[*1] | 1.38 | 0.98 | 0.48 | 3.02 |
| Apparent bulk density (g/ml) | 0.69 | 0.75 | 0.85 | 0.48 |
| Shape of the support prepared | amphora-type | amphora-type | dentless-type | blown-up type |
| Anti-attrition property of the support | | | | |
| Initial attrition rate (wt %/12 hr) | 3.9 | 2.6 | 3.2 | 50.2 |
| Attrition Index (wt %/30 hr) | 6.3 | 2.1 | 3.9 | 6.6 |
| Specific surface area (m$^2$/g) | 276 | 282 | 287 | 177 |
| Specific pore volume (m$^2$/g)[*2] | 0.37 | 0.25 | 0.23 | 0.27 |
| Yield of kerosine-light oil fraction (wt %) | 31 | 30 | 28 | 27 |

TABLE 3-continued

Effect of the average particle size of the slurried solid particles (binder:silica)

|  | Example 1 | Example 3 | Comparative example 1 | Comparative example 2 |
|---|---|---|---|---|
| Yield of coke (wt %) | 8 | 7 | 12 | 8 |
| Yield of deposited asphaltenes (wt %) | 8 | 8 | 10 | 10 |
| Conversion (wt %)*3 | 83 | 83 | 83 | 81 |
| Hydrogen consumption (Nm$^3$/kl) | 110 | 110 | 130 | 120 |

*1 Amount of the used binder is 30 wt % on the dry base after calcination.
*2 Nitrogen method
*3 at 525° C.

TABLE 4

Effect of starting solid material

|  | Example 1 | Example 4 | Example 5 | Example 6 |
|---|---|---|---|---|
| Starting solid material | allophane | red mud | bauxite | laterite |
| Average particle size of slurried solid particles (μm) | 1.38 | 1.05 | 1.29 | 1.03 |
| Apparent bulk density (g/ml) | 0.69 | 0.78 | 0.74 | 0.81 |
| Shape of the support prepared | amphora-type | amphora-type | amphora-type | amphora-type |
| Anti-attrition property of the support |  |  |  |  |
| Initial attrition rate (wt %/12 hr) | 3.9 | 3.9 | 2.6 | 3.2 |
| Attrition Index (wt (wt. %/30 hr) | 6.3 | 6.3 | 4.5 | 5.7 |
| Specific surface area (m$^2$/g) | 276 | 150 | 162 | 115 |
| Specific pore volume (ml/g)*1 | 0.37 | 0.38 | 0.32 | 0.28 |
| Yield of kerosine-light oil fraction (wt %) | 31 | 29 | 30 | 28 |
| Yield of coke (wt %) | 8 | 8 | 9 | 8 |
| Yield of deposited ashphaltenes (wt %) | 8 | 8 | 8 | 9 |
| Conversion (wt %)*2 | 83 | 83 | 84 | 82 |
| Hydrogen consumption (Nm$^3$/kl) | 110 | 110 | 100 | 100 |

*1 Nitrogen method
*2 at 525° C.

As is understood from the above description, the present invention provides an amphora-type particulate catalyst-support having improved properties, i.e., an adequately small average particle size and a low attrition index, namely a high anti-attrition property, which can be advantageously used as a support for preparing catalysts having a high anti-attrition property, especially those which are superior in catalytic activity and performance in the hydrotreating of a heavy oil and can give a high yield of kerosine-light oil fraction with a small consumption of hydrogen and with low yields of cokes and deposited asphaltenes.

In addition, since the catalyst-supports of the present invention are superior in an anti-attrition property, various particulate catalysts, including those as described previously, which are superior in catalyst-life and the resistance against an attrition or a breakdown of the catalyst particles even when used in a manner of a slurry-bed reaction in which the catalyst particles and other contents such as a heavy oil, hydrogen, etc. are mixed with vigorous stirring can be easily prepared from the catalyst-supports of the present invention.

The preferable effects as described above can be attributed mainly to the aspects that the catalyst-supports of the present invention are of amphora-type in particle form and have specified average particle sizes and attrition indexes. This is a great difference from conventional particulate catalyst-supports, including those of amphora-type prepared by the conventional methods.

The present invention also provides a very efficient and reliable method for the preparation of the amphora-type particulate catalyst-supports of the present invention.

What is claimed is:

1. An amphora particulate catalyst-support having an average particle size of 30 to 200 μm and an attrition index of not larger than 10.

2. A method for the preparation of an amphora particulate catalyst-support which comprises the steps of:
   (a) forming a mixed slurry having a solid content of 10 to 30% by weight by adding water to a mixture of 60 to 80 parts by weight of a component (A) comprising at least one component selected from the group consisting of allophane, red mud, bauxite, and laterite with 20 to 40 parts by weight of a binder (B);
   (b) grinding the solid in the mixed slurry by using a wet grinding technique to form a slurry of finely divided solid having an average particle size of 0.6 to 2.0 μm;
   (c) spray-drying the slurry of the finely divided solid to form spray-dried particles; and
   (d) calcining the spray-dried particles to obtain an amphora-type particulate catalyst-support.

3. The method for the preparation of an amphora particulate catalyst-support as claimed in claim 2 wherein the binder (B) is selected from the group consisting of silica, alumina, alumina-titania, rosin, pitch, polybinyl acetate, and phenol-formaldehyde resin.

4. The method for the preparation of an amphora particulate catalyst-support as claimed in claim 2 wherein the binder (B) is silica or alumina-titania.

5. The method for the preparation of an amphora particulate catalyst-support as claimed in claim 2 wherein the binder (B) is alumina-titania in which the ratio of alumina to titania ($Al_2O/TiO_2$) is in the range of 19/1 to 3/7 by weight ratio.

6. The method for the preparation of an amphora particulate catalyst-support as claimed in claim 2, 3, 4 or 5 wherein the average particle size of the amphora-type particulate catalyst-support is in the range of 30 to 200 μm and the attrition index of the amphora-type particulate catalyst-support is less than 10.

7. A hydrogenation catalyst comprising the amphora-type particulate catalyst-support as claimed in claim 1 and at least one catalyst component supported on the amphora particulate catalyst-support, the catalyst component being selected from the group consisting of vanadium, nickel, iron, molybdenum, tungsten, and cobalt.

8. The hydrogenation catalyst as claimed in claim 7 wherein the catalyst component is vanadium and nickel.

9. The hydrogenation catalyst as claimed in claim 8 wherein the hydrogenation catalyst comprises 100 parts by weight of the amphora-type particulate catalyst-support, 1 to 20 parts by weight of vanadium, and 0.5 to 10 parts by weight of nickel, the weight ratio of vanadium to nickel being in the range of 0.5 to 3.0.

10. The hydrogenation catalyst as claimed in claim 9 wherein the hydrogenation catalyst comprises 100 parts by weight of the amphora particulate catalyst-support, 2 to 10 parts by weight of vanadium, and 1 to 5 parts by weight of nickel, the weight ratio of vanadium to nickel being in the range of 1 to 2.

11. In a catalyst support of the type which is amphora shaped and carries a catalyst for use in hydrotreating petroleum; the improvement comprising said catalyst support having an average particle size of 30 to 200 μm and an attrition index of not larger than 10.

12. An amphora particulate catalyst-support having an average particle size of 30 to 200 μm, an attrition index of not larger than 10 and being formed of a mixed aqueous slurry having a solid content of 10 to 30% by weight of a mixture of (A), at least one component selected from the group consisting of allophane, red mud, bauxite, and laterite; and 20 to 40 parts by weight of a binder (B) which has been ground to an average particle size of 06 to 2.0 μm; spray-dried; and calcined to obtain an amphora shaped particulate catalyst-support.

* * * * *